United States Patent [19]

Hain

[11] Patent Number: 4,554,127

[45] Date of Patent: Nov. 19, 1985

[54] METHOD FOR FORMING A PAPERBOARD RECEPTACLE

[75] Inventor: Paul O. Hain, Hamilton, Ohio

[73] Assignee: Champion International Corporation, Stamford, Conn.

[21] Appl. No.: 217,092

[22] Filed: Dec. 16, 1980

[51] Int. Cl.[4] ........................ B29C 11/00; B29D 31/00

[52] U.S. Cl. ...................................... 264/324; 264/345

[58] Field of Search ................................ 264/324, 345

[56] References Cited

U.S. PATENT DOCUMENTS

| | | | |
|---|---|---|---|
| 208,097 | 9/1878 | House | 264/324 |
| 1,617,704 | 2/1927 | Colditz et al. | |
| 1,948,314 | 2/1934 | Pratt et al. | 18/47.5 |
| 1,986,291 | 1/1935 | Schur | 92/21 |
| 2,605,855 | 8/1952 | Lenz | 181/32 |
| 3,511,140 | 5/1970 | Hoyrup | 93/51 |
| 3,675,692 | 7/1972 | Jeans | 144/317 |
| 3,676,295 | 7/1972 | Rue | 162/198 |
| 3,932,575 | 1/1976 | Andersson | 264/154 |

FOREIGN PATENT DOCUMENTS

| | | |
|---|---|---|
| 2908396 | 9/1980 | Fed. Rep. of Germany . |
| 1358646 | 7/1964 | France . |
| 378115 | 8/1932 | United Kingdom . |
| 480790 | 12/1975 | U.S.S.R. . |

OTHER PUBLICATIONS

Whittingtons Dictionary of Plastics p. 258.

*Primary Examiner*—Willard E. Hoag

*Attorney, Agent, or Firm*—Evelyn M. Sommer; John H. Mulholland; William W. Jones

[57] ABSTRACT

Method for forming a paperboard receptacle includes male and female dies which draw the receptacle from a blank. The receptacle is moisturized during the drawing process to plasticize and lubricate the paperboard by injecting steam into one of the dies.

9 Claims, 3 Drawing Figures

METHOD FOR FORMING A PAPERBOARD RECEPTACLE

REFERENCE TO RELATED APPLICATION

This application is related to copending application Ser. No. 119,486, filed Feb. 7, 1980, entitled "Improved Process for Forming Laminated Paperboard Containers" now U.S. Pat. No. 4,313,899.

BACKGROUND OF THE INVENTION

1. Field of the Invention

This invention relates to an apparatus and method for forming a paperboard receptacle from a paperboard blank in male and female dies. More particularly, the present invention relates to injecting steam into one of the forming dies and against a surface of the blank during drawing of the paperboard blank into areceptacle.

2. Description of the Prior Art

Paperboard receptacles are formed from blanks comprising a laminate of paperboard and a plastic film (e.g., a polyester such as polyethylene terepthalate). The portions of the blanks which will form the corners of the receptacle are scored to facilitate forming of the receptacle corners.

Conventional systems for forming a paperboard receptacle have used mating male and female dies to form the receptacle. The peripheral portions of the dies engage the periphery of the blank to place the blank under tension during the drawing process. The central portion of the blank is engaged on its opposite surfaces by mating moveable portions of the male and female dies. The die surfaces may be coated with polytetrafluoroethylene to enhance the release of the formed receptacle from the dies. However, such coatings have been ineffective for forming receptacles at relatively high temperatures (i.e., above 180° F.) since the formed receptacle tends to stick to the female die.

The primary problem of conventional systems for forming paperboard receptacles involves tearing or rupture of the paperboard at the sharp bends between the bottom and side walls of the receptacle. These tears and ruptures can migrate to the scored areas at the corners where the blank is placed under maximum stress during the drawing process and where the blank has been weakened by the scoring. In conventional systems, the tearing and rupturing tendency is increased because the paperboard is not adequately plasticized to permit articles to be readily formed with sharp bends and corners without tearing, rupturing or cracking. Additionally, the friction or adhesion between the paperboard and forming dies causes a discontinuous, creeping drawing action, rather than a smooth, continuous drawing action. The discontinuous, creeping action tends to form wrinkles and will not form smooth side wall surfaces.

Another problem associated with the use of conventional systems for forming paperboard receptacles involves separation of the plastic coating from the underlying paperboard. In conventional systems, the paperboard is passed through a water bath immediately prior to forming to wet the paperboard. This additional wetting of the paperboard, providing a moisture content in the paperboard is of at least ten weight percent, to improve drawing causes wet adhesion problems which decrease the adhesion of the plastic film to the paperboard. The pre-forming wetting operation of conventional systems is also disadvantages in that it increases the dwell time required in the forming cycle in the dies, may necessitate an additional drying cycle and otherwise adversely affects the finished paperboard receptacle, particularly the printing thereof.

SUMMARY OF THE INVENTION

It has now been discovered that a laminated paperboard blank can be formed dry when sufficiently plasticized to permit the paperboard to be readily formed with sharp bends and corners and when sufficiently lubricated to provide with a sufficiently low coefficient of friction between the paperboard and the female die. If sufficient plasticizing of the paperboard and sufficient lubrication between the paperboard and the die surfaces are provided, relatively dry laminated paperboard may be drawn in a manner resulting in an improved product and improved manufacturing procedures.

Accordingly, an object of the present invention is to provide an apparatus and method for forming a paperboard receptacle which plasticizes the paperboard and provides lubrication between the paperboard and the mating die surfaces to permit the receptacle to be readily formed by drawing without tearing, rupturing or cracking.

Another object of the present invention is to provide an apparatus and method for forming a paperboard receptacle which will form improved paperboard receptacles with straight sides, few vertical wrinkles, glossy and smooth side walls, flat bottoms and stiff and sturdy construction.

A further object of the present invention is to provide an apparatus and method for forming a paperboard receptacle wherein better adhesion is provided between the plastic film and the paperboard of the blank used to form the receptacle.

An additional object of the present invention is to provide an apparatus and method for forming a paperboard receptacle which is simple and inexpensive to operate and perform and will enhance the articles made thereby.

The foregoing objects are obtained by an apparatus for forming a paperboard receptacle which comprises mating male and female dies. A moisturizing mechanism is provided for injecting steam into one of the dies to contact a paperboard blank positioned between the dies during drawing of the blank.

The foregoing objects are also obtained by a method of forming a paperboard receptacle having bottom and side walls. The method involves locating a paperboard blank between mating first and second dies. The first die is moved toward the second die to draw the blank into a receptacle. During drawing of the blank, steam is injected into at least one of the dies against a surface of the blank.

In the apparatus and the method of the present invention, the steam injected into the system by the moisturizing mechanism facilitates the forming process and enhances the product formed thereby. The steam plasticizes the fibers of the paperboard quickly and locally at the maximum bend locations, enabling the paperboard to bend and to be molded readily into articles having sharp bends and corners. Additionally, the steam lubricates the sides of the paperboard receptacle and the walls of the die against which the receptacle walls are formed during the drawing process to enable the paperboard to be drawn in a smooth, continuous manner. The plasticizing and the lubrication provided by the injection of steam into the system eliminates tearing, rupturing and cracking at the junctures between the bottom and side walls of the paperboard receptacle and the migration of tearing, rupturing and cracking from such junctures to the scored corner areas of the paperboard receptacle. The injection of steam also eliminates the pre-forming wetting operation resulting in the moisture content of the paperboard after forming being equal to or less than such moisture content before forming. This reduced moisture content in the formed receptacle makes it more rigid.

The steam can be injected into a heated female die at a pressure less than about 15 pounds per square inch, and between about 8 and about 12 pounds per square inch. The heated female die heats the steam to enhance plasticizing of the paperboard.

Additionally, the female die into which the steam is injected can have a reciprocating plunger which engages a paperboard blank with a mating portion of the male die during drawing of the blank into the receptacle. The steam is injected into a lower cavity in the female die in which the reciprocating plunger is mounted, and the steam passes upward through the female die and through a generally annular outlet formed between the plunger and remainder of the female die to direct the steam against portions of the blank forming the receptacle side walls and the junctures of the receptacle bottom and side walls. In this manner, the steam is directed against those portions of the blank which are subjected to the maximum stresses and are the greatest problem areas for tearing, rupturing and cracking.

The apparatus and method of the present invention are particularly advantageous when used with a paperboard blank which is coated on one surface with a plastic film. For such blank, the steam is directed against the paperboard side of the paperboard-plastic film laminate.

Other advantages and salient features of the present invention will become apparent from the following detailed description which, taken in conjunction with the annexed drawings, discloses a preferred embodiment of the present invention.

As used in this application, the term "plasticizing" means making paperboard more moldable.

BRIEF DESCRIPTION OF THE DRAWINGS

Referring to the drawings which form a part of this original disclosure.

DETAILED DESCRIPTION OF THE PREFERRED EMBODIMENT OF THE INVENTION

Figure 1:
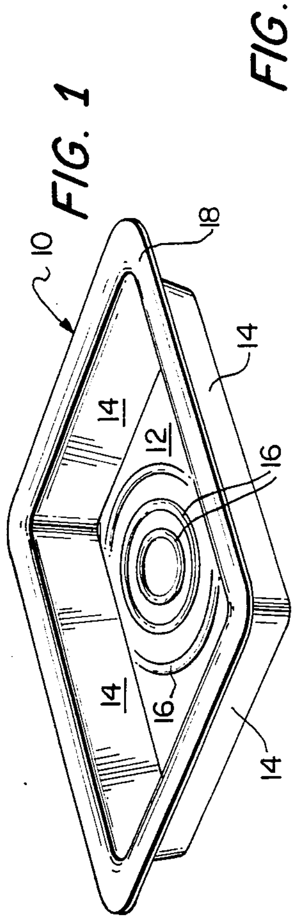
FIG. 1 is a perspective view of a paperboard receptacle of a type to be formed by the system of the present invention.

Referring to FIG. 1, the apparatus and method of the present invention forms a paperboard receptacle or tray 10 having a bottom wall 12 and side walls 14. Bottom wall 12 is generally rectangular with rounded corners and has stiffening ribs 16 formed therein. Side walls 14 extend upwardly and diverge from the periphery of bottom wall 12 and are joined at rounded corners. A flange 18 extends about the periphery of side walls 14 from edges thereof remote from bottom wall 12, and is generally parallel to bottom wall 12. Other receptacle configurations may be formed depending on the shape of the forming dies.

Figure 3:
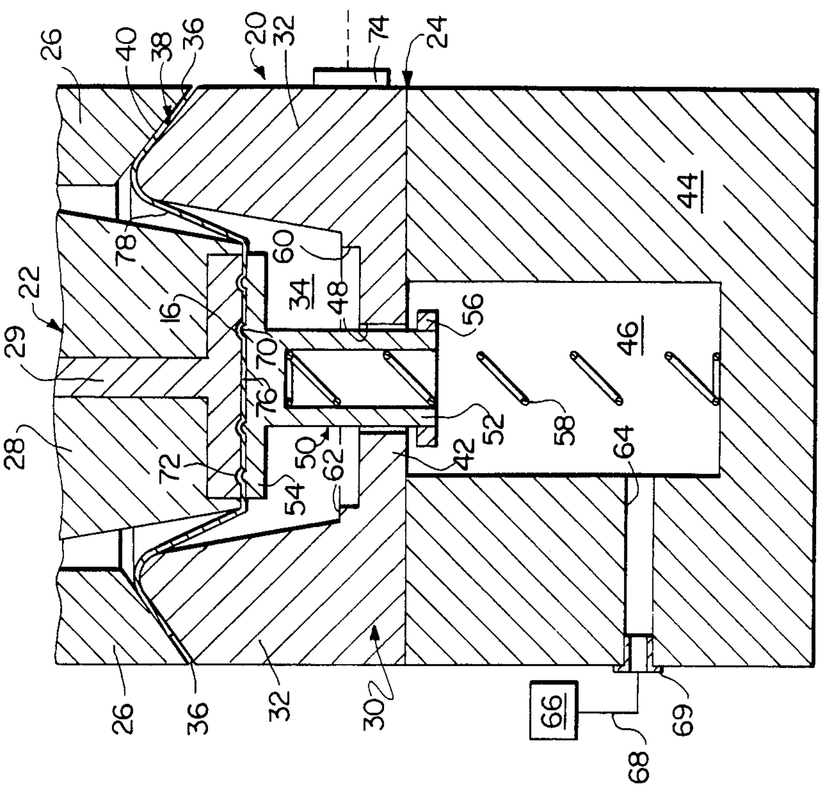
FIG. 3 is a side elevational view in cross section of the system of FIG. 2 at an intermediate forming stage.
Figure 2:
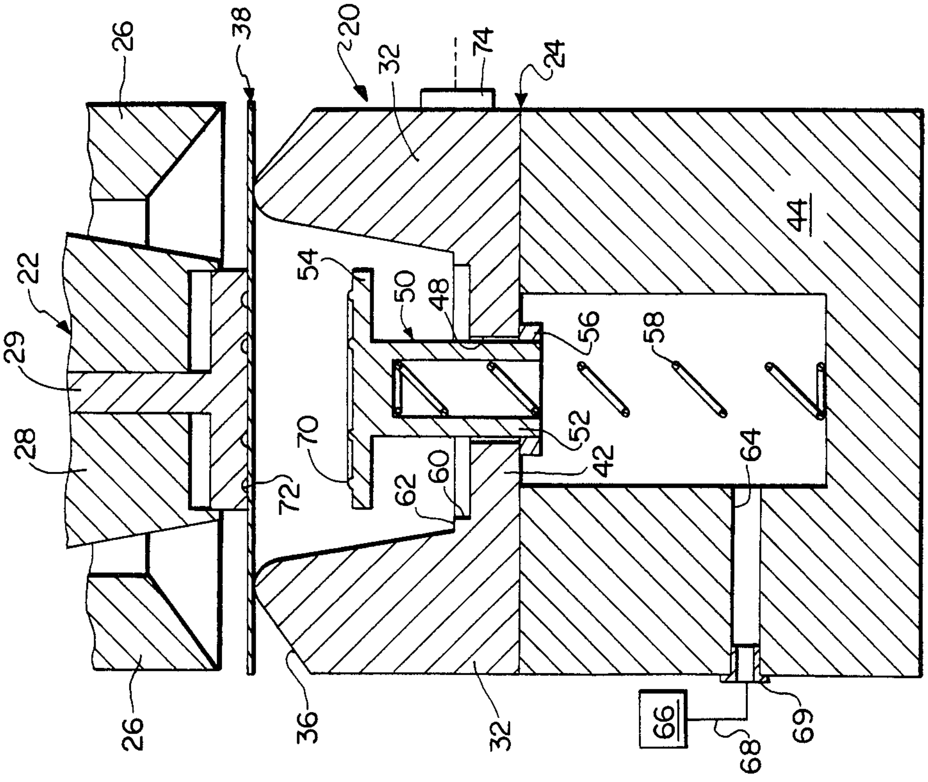
FIG. 2 is a side elevational view in cross section of the system for forming a paperboard receptacle in accordance with the present invention at an initial forming stage.

The apparatus 20 for forming the paperboard receptacle 10 is illustrated in FIGS. 2 and 3 in initial and intermediate stages of the drawing process, respectively. Apparatus 20 comprises mating male and female dies 22, 24.

Male die 22 has a retaining ring 26 which extends about the periphery of the male die. A relatively moveable center portion 28, generally in the form of a pyramidal frustum, is mounted within retaining ring 26. Center portion 28 has a male plunger 29 moveably mounted therein and spring biased towards an extended position as illustrated in FIG. 2. Retaining ring 26 and center portion 28 are conventionally coupled by a suitable mechanism so to permit relative movement therebetween and are coupled to suitable driving mechanisms in conventional manners to enable the retaining ring and center portion to reciprocate relative to female die 24.

Female die 24 comprises a base 30 and upstanding side walls 32. Base 30 and side walls 32 define an upper cavity 34 which conforms to the external configuration of receptacle 10 and of male die center portion 28. The inner surfaces of side walls 32 extend upwardly and outwardly to form the diverging side walls 14 of receptacle 10. The top surfaces 36 of side walls 32 surround the open top of upper cavity 34, are angled downwardly and outwardly and are axially aligned with retaining ring 26 to grip blank 38 at its peripheral portion 40.

Base 30 comprises upper and lower sections 42, 44. Upper section 42 is formed unitarily with side walls 32. Sections 42, 44 are secured in a suitable and conventional manner. A lower cavity 46 is centrally located in lower section 44. Upper cavity 34 communicates with lower cavity 46 through a constricted opening 48 provided in base upper section 42.

A plunger 50 is moveably mounted in cavities 34, 46 for reciprocation between raised and lowered positions. Plunger 50 comprises a generally cylindrical body 52 having a plate shaped head member 54 on its upper end and a stop 56 fixedly coupled at its lower end. Plunger 50 reciprocates along an axis which is coaxial with the axes of cavities 34, 46 and opening 48 with head member 54 located in upper cavity 34 and with stop 56 located in lower cavity 46. A spring 58 resiliently biases plunger 50 toward its raised position. Both head member 54 and stop 56 have dimensions in directions perpendicular to the axis of movement of plunger 50 larger than corresponding dimensions of opening 48 to retain head member 54 and stop 56 in cavities 34, 46, respectively, and body 52 within opening 48. The dimensions of body 52 transverse to the plunger axis of movement are less than the corresponding dimensions of opening 48 to provide an annular space therebetween.

Upper cavity 34 has a recess 60 formed in its lowermost portion surrounding opening 48 to receive head member 54. The depth of recess 60 is approximately equal to the thickness of head member 54 to permit the upper surface of head member 54 to be coplanar with the bottom surface 62 of upper cavity 34 when plunger 50 is fully retracted.

A transverse passageway 64 is formed in base lower section 44 perpendicular to and in communication with lower cavity 46. Passageway 64 extends from lower cavity 46 to the exterior of base lower section 44.

A controlled pressure source of saturated steam 66 is in fluid communication with passageway 64 through suitable conduits 68 and a suitable coupling 69. This arrangement enables steam from steam source 66 to pass through conduits 68, coupling 69 and passageway 64, and into lower cavity 46 at a predetermined pressure. From lower cavity 46, the steam travels about plunger 50, through opening 48 and into upper cavity 34 where this steam contacts and moisturizes the paperboard blank and the die surfaces defining cavity 34 as the blank is being drawn to form receptacle 10.

Ridges 70 are provided on the upper surface of head member 54. Grooves 72 are formed in the lower, blank contacting surface of male plunger 29. These ridges and grooves mate and form the stiffening ribs 16 in receptacle bottom wall 12.

Suitable heating means can be provided in female die 24 to maintain its temperature in the range between about 300° F. and about 400° F., typically about 350° F. A thermistor 74 may be suitably coupled to female die 54 to measure and control the temperature of the female die.

In operation, the male and female dies are initially spaced apart a sufficient distance to permit a paperboard blank 38 to be positioned therebetween. With paperboard which is coated with a plastic film (e.g., polyethylene terephthalate at 28 to 30 pounds for 3000 square feet of paperboard surface), the plastic film-paperboard laminate is placed between dies 22, 24 with the plastic film facing male die 22 and the paperboard layer facing female die 24.

Once the paperboard blank 38 has been properly positioned between the male and female dies, male die 22 is lowered. Blank 38 is engaged by plunger 29 of male die 22 before engagement with retaining ring 28 permitting blank peripheral portion 40 to roll into female die 24. Subsequently, peripheral portion 40 of blank 38 is gripped between top surfaces 36 of female die 24 and retaining ring 26 of male die 22. The central portion 76 of blank 38 (i.e., that portion forming bottom wall 12) is then trapped between male die center portion 28 and plunger 29 and the head member 54 of female die 24. The engagement of center portion 28 and plunger 29 with head member 54 and the mating of ridges 70 and grooves 72 form stiffening ribs 16 in blank 38.

The gripping of blank 38 by retaining ring 26 and top surfaces 36 form the peripheral flange 18 of tray 10. Additionally, the force applied by ring 26 is limited such that blank 38 is permitted to slip to a predetermined extent to place blank 38 under tension during the drawing process.

The drawing of the blank to form side walls 14 of receptacle 10 is accomplished by the downward movement of male die center portion 28 and plunger 29. This downward movement causes the intermediate portion 78 of blank 38 located between central portion 76 and peripheral portion 40 to be stretched and molded to form side walls 14 of receptacle 10.

During the drawing of blank 38 in male and female dies 22, 24 to form receptacle 10, steam from controlled saturated steam source 66 passes through conduits 68 and coupling 69 and into passageway 64. From passageway 64 the steam enters lower cavity 46 and passes around plunger 50, through opening 48 and into upper cavity 34. By injecting the steam in this manner, the steam is directed against those portions of blank 38 which undergo the most stress during the drawing process. Specifically, plunger 50 directs the steam against intermediate portion 78 of blank 38 and the juncture of the intermediate portion 78 with central portion 76, which juncture forms the sharp bends and corners along the periphery of receptacle bottom wall 12. Since the dimensions of center portion 28 in directions perpendicular to the axial movement thereof are greater than the corresponding dimensions of head member 54, the juncture between central and intermediate portions 76, 78 of blank 38 (i.e., those portions forming the critical juncture between bottom wall 12 and side walls 14 of receptacle 10) is exposed within chamber 34 so as to permit direct exposure to the steam injected therein.

The steam is injected into female die 24 at a pressure less than about 15 pounds per square inch so as not to disrupt the forming process. The steam may be introduced at a pressure in the range between about 8 and 12 pounds per square inch and is preferably in the range of between about 10 and 12 pounds per square inch.

The dies exert a total pressure of about 12 tons on the blank, with a final clinch of about 500 to 1000 pounds per square inch. After the drawing process has been completed, male die 22 is raised above female die 24 to permit removal of the formed receptacle. As male die 28 is raised, plunger 50 will push the formed receptacle upwardly out of upper cavity 34 under the bias of spring 58.

By molding or drawing the receptacle 10 from blank 38 in this manner, the steam introduced into female die 24 quickly plasticizes the fibers of the paperboard so that they can bend and be molded more easily. Additionally, the steam moisturizes, thereby lubricating, the contacting surfaces of the paperboard blank 38 and of female die 24 to permit a smooth and continuous drawing action. This lubrication also facilitates removal of the formed receptacle from female die 24.

As the steam is injected into the heated female die 24, the temperature of the steam is raised further facilitating the forming process by increasing plasticization of cellulose, by reducing crack formation and by enhancing the adhesion of the plastic film to the paperboard.

The moisturizing of the paperboard blank by injecting steam during the drawing process to plasticize and lubricate the blank permits the blank to be drawn with paperboard comprising as low as 3 weight percent water, as high as 7 weight percent water and normally between 4 and 6 weight percent water, rather than with the 10 weight percent or more values presently employed in conventional drawing systems. This reduction in the weight percentage of water in the paperboard increases and adhesion of the plastic film to the paperboard, increases the stiffness of the formed receptacle, reduces the dwell time of the blank in the dies, eliminates a drying cycle and reduces curl problems in the press feed.

Additionally, the reduction in the weight percentage of water in the paperboard facilitates printing by permitting the use of color offset printing systems which completely dry before forming of the paperboard, in lieu of the use of aniline press printing on wet paperboard. The elimination of the conventional pre-forming wetting operation results in a clearer image by elimination of the smudging and smearing caused by such operation. Thus, by reducing the moisture content in the paperboard blank, the receptacle formed therefrom and the method of forming are improved.

By forming the receptacle according to the present invention, the sides of the receptacle are formed straight and smooth without wrinkles in the paperboard or in the plastic film. The adhesion of the plastic film is improved. Additionally, the tray formed by this method is stiffer and more rigid, has flatter bottoms and has improved nesting and stacking characteristics. It is believed that the plasticizing and lubrication provided by the steam injection will facilitate the formation of more complicated paperboard products by drawing.

Although the invention has been described in considerable detail with particular reference to a certain preferred embodiment thereof, variations and modifications can be effected within the spirit and scope of the invention as defined in the appended claims.

What is claimed is:

1. A method of forming a paperboard receptacle having a bottom and side walls, which comprises locating a paperboard blank between mating first and second dies;

moving said first die toward said second die to draw said blank into a receptacle; and injecting steam into at least one of said dies and against a surface of said blank during drawing of said blank.

2. A method according to claim 1, wherein said steam is directed against portions of said blank forming the receptacle side walls and the juncture of the receptacle bottom and side walls.

3. A method according to claim 1, wherein said steam is directed against portions of said blank forming the receptacle side walls.

4. A method according to claim 1, wherein said blank is engaged at a peripheral portion thereof by peripheral portions of said first and second dies and at a central portion thereof by mating moveable center portions of said first and second dies; and wherein said steam is injected into said second die and is conveyed therein against an intermediate portion of said blank between said central and peripheral portions of said blank.

5. A method according to claim 1, wherein said steam is injected at a pressure less than about 15 pounds per square inch.

6..A method according to claim 1, wherein said steam is injected at a pressure in the range between about 8 to 12 pounds per square inch.

7. A method according to claim 1, wherein said steam is injected into said second die, and said second die is heated to a temperature between about 300° F. and 400° F.

8. A method according to claim 1, wherein said paperboard blank comprises approximately 4 to 6 weight percent water.

9. A method according to claim 1, wherein said paperboard is coated with a plastic film on a surface opposite that contacted by said steam.

* * * * *